A. L. CAMPBELL.
FRAME FOR MOTOR CARS.
APPLICATION FILED APR. 26, 1917.
1,243,255.
Patented Oct. 16, 1917.
2 SHEETS—SHEET 2.
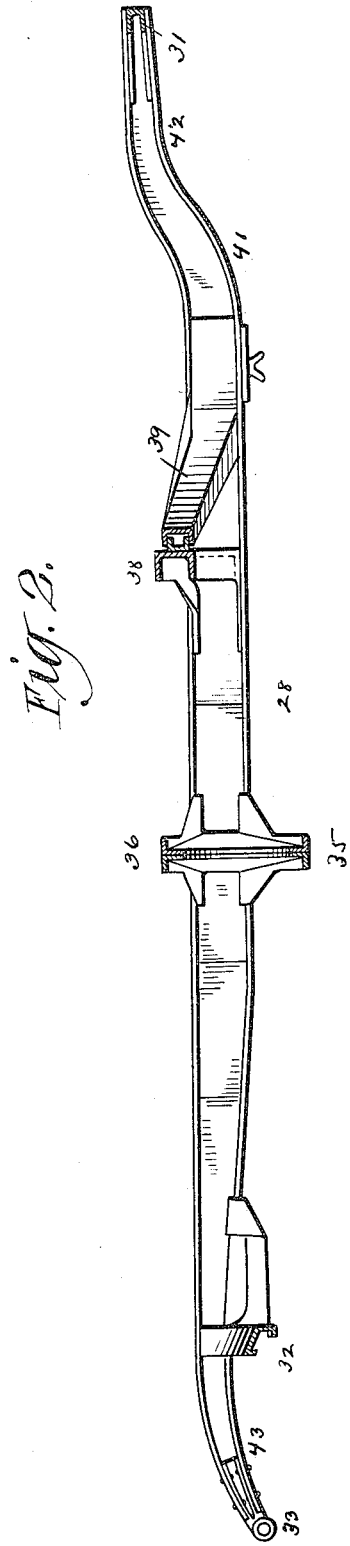
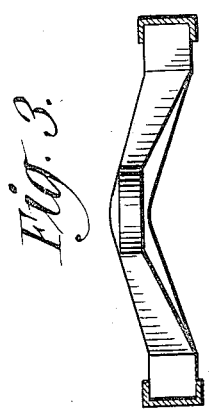
Alfred L. Campbell
Inventor
By his Attorneys

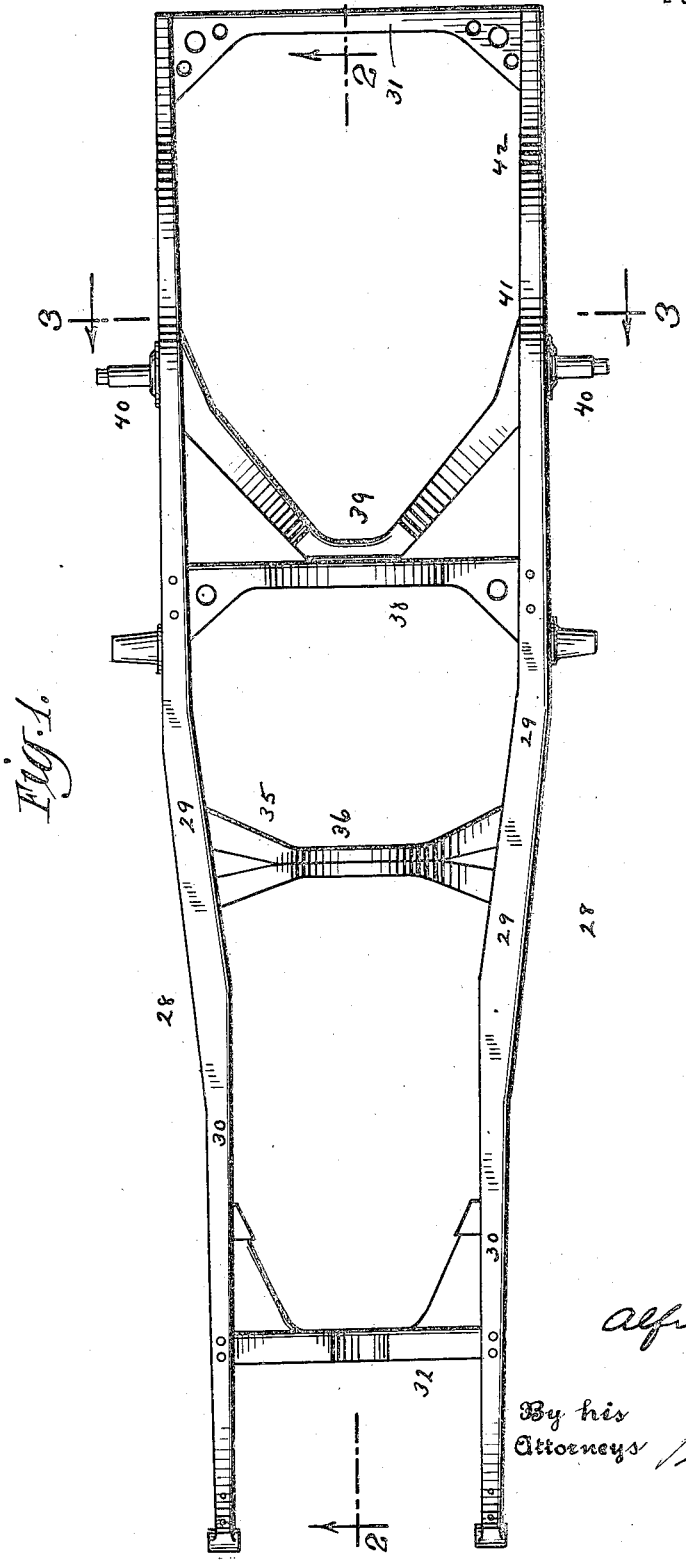

UNITED STATES PATENT OFFICE.

ALFRED L. CAMPBELL, OF ELMHURST, NEW YORK.

FRAME FOR MOTOR-CARS.

1,243,255.  Specification of Letters Patent.  Patented Oct. 16, 1917.

Original application filed August 22, 1916, Serial No. 116,303. Divided and this application filed April 26, 1917. Serial No. 164,707.

*To all whom it may concern:*

Be it known that I, ALFRED L. CAMPBELL, a citizen of the United States, residing at 31 25th street, Elmhurst, Long Island, New York, have invented a new and useful Improvement in Frames for Motor-Cars, of which the following is a specification.

My invention consists of certain improvements in the frame of the driving mechanism of motor cars.

In order that my invention may be fully understood, I shall first describe in detail the mode in which I, at present, prefer to carry into practice the various features of my invention and then point out the various features in the claim.

Reference is to be had to the accompanying drawings forming part of this specification, in which like parts are designated by the same numerals in all the figures.

Figure 1 is a plan view of the frame of a driving mechanism for motor cars constructed in accordance with my invention.

Fig. 2 is a longitudinal sectional view of the same on the line 2—2, Fig. 1.

Fig. 3 is a cross-sectional view of the same on the line 3—3, Fig. 1.

I make the frame of the driving mechanism of two longitudinal side members 28, bent inwardly at 29, and outwardly at 30, so as to make the frame taper or narrow forwardly, and rigidly connected at the rear ends by the cross member 31, and near the front ends by the cross member 32, where the motor is rigidly attached to the frame.

Immediately in the rear of the clutch, I rigidly connect the side members 29 of the frame 28 by a cross member 35, in the middle of which is fixed a socket bearing 36 to hold a universally movable spherical shell.

Between the universal bearing 36 and the rear cross member 31, I rigidly connect the side members 29 of the frame 28, by a cross member 38, bowed or arched upwardly over the torque tube and above the side members 29, as best shown in Fig. 2, and by a forwardly and upwardly arched or bowed V or U-shaped cross member 39, having its vertex rigidly attached to the middle of the cross member 38, and its rear ends rigidly attached to the respective side members 29 at the spring supports 40.

The rear ends of the side members 29 are also bent upwardly at 41 and rearwardly at 42, and the forward ends curved downwardly at 43.

By this construction of the frame 28 in conjunction with the cantaliver springs, undue twisting of the frame is prevented and a lower frame is obtained without unduly lowering the driving shaft and connecting mechanism.

This application is a division of a prior application for patent filed by me August 22, 1916, Serial No. 116,303.

I claim as my invention:

A frame for the driving mechanism of motor cars consisting of side members, a forward cross member and a rear cross member connecting the side members, a medial cross member 38 connecting and arched above the side members, and a medial cross member 39, connecting the side members, and bowed both vertically above the side members and forwardly to its attachment to the arched cross member 38.

ALFRED L. CAMPBELL.